UNITED STATES PATENT OFFICE.

HORACE KOECHLIN, OF LOERRACH, AND OTTO N. WITT, OF MULHAUSEN, GERMANY.

MANUFACTURE OF BLUE COLORING-MATTERS CALLED "INDOPHENOLS."

SPECIFICATION forming part of Letters Patent No. 263,341, dated August 29, 1882.

Application filed March 22, 1882. (No specimens.) Patented in France March 19, 1881, No. 141,843; in England March 28, 1881, No. 1,373; in Belgium April 4, 1881, No. 54,288; in Sweden July 30, 1881, and in Austria March 12, 1882, No. 1,695.

*To all whom it may concern:*

Be it known that we, HORACE KOECHLIN, a resident of Loerrach, and OTTO N. WITT, a resident of Mulhausen, German Empire, have invented a new and useful Improvement in the Manufacture of Blue Coloring-Matters called "Indophenols," which improvement is fully set forth in the following specification.

This invention relates to the production or manufacture of coloring-matters or dye-stuffs of the same or a similar nature to the series described in our application for patent filed April 30, 1881, and numbered 32,110. The name of "indophenols" has been given to the coloring-matters or dye-stuffs of this series. Their preparation or formation, as described in said application, is based upon the reaction of nitrous derivatives of amines or chloroquinominides upon phenols in the presence of a reducing agent, or of paramido derivatives of amines upon phenols in the presence of an oxidizing agent, and the coloring-matters or dye-stuffs are insoluble in water or alkaline lyes.

The present invention has reference mainly to the preparation of soluble indophenols; but it comprises also a modification and simplification in the methods of manufacture applicable generally to the formation of indophenols.

The following is a description of a method or process of making soluble indophenol in accordance with the present invention:

A mixture of ten pounds nitroso-dimethylaniline, (free base,) nineteen pounds alpha-naphthol, and thirty-five pounds alcohol is heated in a water bath until the reaction is complete and no more dimethylaniline can be detected in the mass by the usual reagents. Five and one-half (5.5) pounds of caustic soda are then added and the spirit distilled off. The residue may be powdered, and forms an excellent dye-stuff easily soluble in warm water. If the operation is completed without addition of the caustic alkali, the residue will be a dye-stuff soluble in alkaline lyes.

In this process there are two improvements: first, the reaction between the nitroso body (nitroso-dimethylaniline) and the phenol (alpha-naphthol) is effected by simple heating of the ingredients without the presence of alkali or a reducing agent, as described in our aforesaid application; and, second, the indophenol is at once obtained in the shape of leuco compound, and rendered soluble in alkaline lyes by excess of the phenol, (alpha-naphthol,) and in water by the addition of alkali. The first improvement is also applicable to the preparation of insoluble indophenols, and under it the reaction may be effected without as well as with alcohol or other suitable solvent. In the example given nine and one-half pounds alpha-naphthol suffices when it is not desired to obtain soluble indophenol.

The second improvement may be used to render soluble ready-formed indophenols prepared in any suitable way, and also in the preparation of soluble indophenols when the indophenol is formed otherwise than by simple heating of the nitroso body and the phenol. For example, ready-formed indophenol can be treated with a suitable quantity of naphthol sodium; or an excess of phenol can be used in the preparation of the color from amido derivatives and phenols, as described in our application aforesaid, the solutions being kept neutral or even slightly basic. The products obtained likewise belong to the class of insoluble indophenols.

In the formation of indophenols it is not essential that the nitroso or paramido derivatives of amines or chloroquinominides should react upon the phenols. They can also be produced by treating a mixture of paramido derivatives of the phenols and amines with oxidizing agents in acid or neutral or basic solutions, and after or in the process of production be rendered soluble by an excess of phenol and addition of caustic alkali, as above indicated. For example, fifteen pounds paramido-phenol hydrochloride is dissolved in twenty-five gallons of water. A solution of sixteen pounds dimethylaniline hydrochloride in ten gallons of water is mixed therewith, and, after well stirring, a solution of twenty pounds potassic bichromate in fifty gallons of water is added. A blue coloration is obtained instantaneously, and the dye-stuff formed may be collected and purified in the usual way. It is in every respect similar to that obtained from paramido dimethylaniline and phenol, as described in the aforesaid application, and the reaction can also be made to take place in or on the textile fiber or fabric, and thus be utilized in dyeing and calico-printing. Instead of water, other solvents may be used.

The foregoing are given as fair samples of general reactions. Other phenols can be used instead of those indicated. Thus, for alpha-naphthol other phenols can be used, or a part of the alpha-naphthol may be replaced thereby. The indophenols will be essentially alike, although the properties will be more or less modified by the particular reagents selected. A primary, secondary, or tertiary amine or chloroquinominide or mixture of the same can be used.

Having now fully described our said invention, and the manner of carrying the same into effect, what we claim is—

1. The method of making soluble indophenols by treating with phenols or their alkaline derivatives the insoluble indophenols in the formation of the latter or when already formed, substantially as described.

2. The products of the described process—that is to say, soluble indophenols having the properties set forth.

3. The improvement in the formation of indophenols, consisting in effecting the reaction between the nitroso bodies or chloroquinominides and phenols, substantially as described.

4. The improvement in the formation of indophenols, consisting in effecting the reaction between paramido derivatives of the phenols and the amines by the mere application of heat, substantially as described.

In testimony whereof we have signed this specification in the presence of two subscribing witnesses.

HORACE KOECHLIN.
OTTO N. WITT.

Witnesses:
Dr. TH. HUTH,
Dr. C. SCHALL.